United States Patent [19]

Vandenberg

[11] Patent Number: 4,833,183

[45] Date of Patent: May 23, 1989

[54] POLY [3-(SUBSTITUTED)-3(HYDROXYMETHYL)OXETANE] AND METHOD OF PREPARING SAME

[75] Inventor: Edwin J. Vandenberg, Fountain Hills, Ariz.

[73] Assignee: Arizona Board of Regents, Tempe, Ariz.

[21] Appl. No.: 201,749

[22] Filed: Jun. 3, 1988

[51] Int. Cl.$^4$ .................. C08G 65/22; C08G 65/18; C08G 65/32

[52] U.S. Cl. ........................ 524/35; 524/47; 525/56; 525/60; 525/410; 525/411; 528/10; 528/14; 528/417

[58] Field of Search .................. 524/37, 47; 525/56, 525/60, 410, 411; 528/10, 14, 417

[56] References Cited

U.S. PATENT DOCUMENTS

| | | | |
|---|---|---|---|
| 3,338,867 | 8/1967 | Plueddemann | 528/10 |
| 3,341,475 | 9/1967 | Vandenberg | 525/410 X |
| 3,417,036 | 12/1968 | Vandenberg | 525/410 X |
| 3,446,757 | 5/1969 | Vandenberg | 528/10 X |
| 3,694,383 | 9/1972 | Azami et al. | 525/410 X |
| 3,839,235 | 10/1974 | Margraff | 525/410 |

Primary Examiner—Earl Nielsen
Attorney, Agent, or Firm—Richard R. Mybeck

[57] ABSTRACT

Poly[3,3-bis(hydroxymethyl)oxetane] ("PBHMO") is prepared in high molecular weight ($n_{inh}$ to 5.2) by polymerizing the trimethylsilylether of 3,3-bis(hydroxymethyl)oxetane with i-Bu$_3$Al-0.7 H$_2$O cationic catalyst at low temperature, followed by hydrolysis. PBHMO is crystalline, high melting (about 314° C.), highly insoluble and useful in the production of films and fibers. Poly[3-methyl-3-(hydromethyl)oxetane] ("PMHMO") and poly[3-ethyl-3-(hydroxymethyl)oxetane] ("PEHMO") are also prepared in high molecular weight ($n_{inh}$ up to 3.8) by the same procedures. Copolymers of BHMO, MHMO, and EHMO with each other or containing up to about 50% of other oxethanes, oxiranes and tetrahydrofurans; derivatives and alloys from these polymers and copolymers; and methods of preparing the polymers, copolymers, alloys and derivatives into useful films, fibers and articles is described.

16 Claims, No Drawings

POLY [3-(SUBSTITUTED)-3(HYDROXYMETHYL)OXETANE] AND METHOD OF PREPARING SAME

INTRODUCTION

The present invention relates to high molecular weight poly[3,3-bis(hydroxymethyl) oxetane] ("PBHMO"); poly[3-methyl-3-(hydroxymethyl)oxetane] ("PMHMO"); poly[3-ethyl-3-(hydroxymethyl)oxetane] ("PEHMO"); copolymers of BHMO, MHMO and EHMO; and copolymers of BHMO, MHMO and EHMO containing up to about 50% of oxetanes, oxiranes and tetrahydrofurans; certain derivatives of these polymers and copolymers; and methods of preparing the same.

BACKGROUND OF THE PRESENT INVENTION

Poly[3,3-bis(hydroxymethyl)oxetane] ("PBHMO") is an interesting analog of cellulose because it has similar hydroxyl and ether contents, a very high melting point (314° C.), and is highly insoluble. However, there are important differences which clearly distinguish PBHMO from cellulose, namely, the hydroxyls of PBHMO are all primary; the main chain oxygens of PBHMO are ordinary ethers, not acetals; and there are no asymmetric carbon atoms. The homopolymers of the closely related oxetanes, MHMO and EHMO (atactic and isotactic) are also crystalline, lower melting than PBHMO but possess unique attributes and utility in their own right. Copolymers and terpolymers of BHMO, EHMO, and MHMO are also useful as will appear.

A form of PBHMO having a very low molecular weight was first reported by Farthing (See: *J. Chem. Soc.*, 1955, 3648) who obtained that polymer by the polymerization of the cyclic acetone ketal of 3,3-bis(hydroxymethyl)oxetane (BHMO) with $BF_3$-etherate catalyst followed by hydrolysis. However, the production of PBHMO having the unique properties of the polymer disclosed herein and the production of PMHMO and PEHMO in accordance herewith is not known.

BRIEF SUMMARY OF THE INVENTION

The unique polymers and copolymers of the present invention are prepared by polymerizing with known coordination and cationic catalysts, a BHMO, MHMO or EHMO monomer which has been carefully modified by the removal of the active hydrogen from the hydroxyl groups thereof by making a ketal or acetal, or by making a trialkylsilyl ether of the hydroxyl. The resultant high molecular weight polymer or copolymer is then treated as by hydrolysis, alcoholysis, and the like, to convert it to the desired BHMO, MHMO or EHMO, homopolymer or copolymer.

The resultant PBHMO, PMHMO and PEHMO and the preferred copolymers thereof are crystalline, have a high molecular weight (Mw > 50,000), a high melting point (about > 300° C. for PBHMO, about > 150° C. for PMHMO and about > 100° C. for PEHMO and physical properties and uses much like cellulose but with large improvements in hydrolytic and oxidative stability and other properties to be hereinafter described. The symbol "Mw" as used herein defines weight average molecular weight.

Further, as will appear, the new polymers of the present invention have the propensity to be converted into useful, high strength fibers, films, molded articles, synthetic paper, and like useful structures.

Derivatives of PBHMO, PMHMO and PEHMO and the copolymers of those derivatives are also useful. For example, the full or partial nitrate esters thereof are improved components of explosives and propellants and provide nitrocellulose type coatings with superior stability. Typical derivatives embraced herein include the xanthates, acetates, formates and like esters, the sulfate esters, the phosphate esters, ethylene oxide and propylene oxide adducts, and ethers (methyl, ethyl, carboxy methyl).

Accordingly, a prime objective of the present invention is to produce and characterize high molecular weight PBHMO, PMHMO and PEHMO and create useful films, fibers and articles therefrom.

A further object of the present invention is to provide new and useful polymers related to PBHMO, PMHMO, and PEHMO and copolymers of BHMO, MHMO and/or EHMO to provide a family of hydroxypolyethers with diverse properties and utility.

Still another object of the present invention is to provide new and unique copolymers of BHMO with MHMO which over an extended composition range are especially unique because they are crystalline, have a melting point which varies linearly with composition, and are an unusual isomorphous system in which the BHMO or MHMO units fit into the same crystal lattice.

These and still further objects as shall hereinafter appear, are readily fulfilled by the present invention in a totally unexpected manner as shall be readily discerned from the following detailed description of exemplary embodiments thereof.

DESCRIPTION OF PREFERRED EMBODIMENTS

In the practice of the present invention, the protocol described below was followed.

The polymerization can be run with or without diluent. Diluents and/or solvents used in polymerizations and syntheses such as toluene, DMSO, n-heptane, ether, and $CH_2Cl_2$ were all C.P., or high purity materials and free of reactive materials which would otherwise destroy the catalysts used herein. Each reagent was dried over mol sieves before use. The triisobutylaluminum and triethylaluminum (commercial products of Texas Alkyls, Inc.) were dissolved in n-heptane or n-hexane (0.9 and 1.5 M respectively). Dialysis tubing (VWR, 2000 molecular weight cut-off) was generally conditioned by soaking several hours in distilled water before use. Bis(trimethylsilyl)acetamide (BSA) was obtained from Petrarch Chemical Company. Santonox, a phenolic antioxidant, from Monsanto was used to stabilize the polymers as indicated. Low boiling petroleum ether (LBPE) was distilled over $CaH_2$ before use. Tetrahydrofuran (THF) was "Baker Analyzed" from J. T. Baker Chemical Company (<20 ppm $H_2O$). A 2:1 mixture of trifluoroacetic acid-d:trifluoroacetic anhydride was made by adding $D_2O$ to trifluoroacetic anhydride. The resulting mixture contained a small unknown impurity at 4.01δ as did Aldrich trifluoroacetic acid-d. Triton B (Aldrich) is a 40 wt % solution of N-benzyltrimethyl ammonium hydroxide in methanol.

Monomers. 3,3-bis(hydroxymethyl)oxetane ("BHMO") was prepared following the general procedure described by Pattison (See: *J. Am. Chem. Soc.* 79, 3455 (1957)). The solid product, obtained from 750 grams, 5.51 mol of pentaerythritol, was 258.1 grams, 40% yield. $^1$H-NMR (DMSO d$_6$), δ:3.54 (d, CH$_2$OH, J=5.2 Hz), 4.26 (s, O—CH$_2$, ring protons), 4.70 (t, OH, J—5.2 Hz).

7:7-Dimethyl-2:6:8-trioxaspirol[3:5]nonane ("DTN") was prepared using the procedure of Elliot et al. (See: *J. Org. Chem.* 41, 2469 (1976)) for preparing cyclic ketals from acetone.

In a 500 ml round-bottomed flask was placed BHMO (91.3 g, 0.77 mol), 2,2-dimethoxypropane (120 ml, 1.16 mol) and pyridinium-p-toluenesulfonate (9.4 mg). Methanol was distilled off until 60 ml was collected and 60 ml of tetrahydrofuran ("THF") was added to maintain the pot temperature below 90° C. Thereafter, the pressure was reduced to 0.5 mm Hg and the crude ketal was distilled out at 35°-60° C. The material was then redistilled to yield 39.9 grams of material which was 99% pure by $^1$H-NMR After recrystallization from low boiling petroleum ether at −78° C., ketal of sufficient purity for polymerization was obtained. $^1$H-NMR (CDCl$_3$), δ:1.34 (s, CH$_3$), 3.58 (s, O—CH$_2$), 4.41 (s, O—CH$_2$, ring protons).

3,3-bis(trimethylsilyloxymethyl)oxetane ("BTMSO") was prepared by dissolving 258.1 grams, 2.19 mol of BHMO in THF (1.25 L) in a flame dried 3-liter 3-necked round-bottomed flask. The mixture was then brought to reflux under nitrogen. Bis(trimethylsilyl)acetamide (BSA) (567 ml, 2.29 mol) was added over a period of 80 minutes. The reaction was followed by 90 MHz $^1$H-NMR in DMSO-d$_6$ using a Bruker WH-90 FT-NMR spectrometer and these data required that extra BSA be added: 96 ml, 0.39 mol at 3 hours, and then 113 ml, 0.46 mol at 6 hours. After refluxing a total of 17.6 hours, the mixture was cooled to room temperature and 60 ml of anhydrous ethanol was added and then stirred 15 hours. The solvent was then removed on a rotary evaporator, the acetamide filtered off and washed with two-250 ml portions of low boiling petroleum ether ("LBPE"). After standing 3 days at 0° C., 500 ml more LBPE was added and the mixture allowed to stand four more days in order to precipitate the acetamide. The acetamide was then filtered off and washed free of product with LBPE. The solvent was then stripped off on a rotary evaporator and distilled under vacuum (0.1 mm Hg) through a one-meter packed column. A heart cut of 315.8 g boiling at 54°-61° C. was collected which was at least 99.8% pure by $^1$H-NMR. A forerun of 20 g (bp 45°-46° C.) was discarded after the solid acetamide had distilled off. Two other fractions weighing 171.8 g with boiling points somewhat higher and lower than the heart cut were collected. They were also found to be at least 99.8% pure by $^1$H-NMR (CDCl$_3$) Total yield 82%. $^1$H-NMR (CDCl$_3$), δ:0.103 (s, Si—CH$_3$), 3.74 (s, CH$_2$OSi—CH$_3$), 4.38 (s, OCH$_2$, ring protons).

3-methyl-3 hydroxymethyloxetane ("MHMO") is commercially available (Aldrich Chemical Co., Milwaukee, Wisc.) or can be prepared using Pattison's general procedure (supra).

3-methyl-3-trimethylsilyloxymethyloxetane ("MTMSO") was prepared in a 2-liter round-bottomed flask equipped with a reflux condenser and a CaCl$_2$ drying tube into which was placed 301.2 g (2.95 mol) of crude MHMO and 700 ml of anhydrous ether. Bis(trimethylsilyl)acetamide (BSA) was then added dropwise to the mixture at room temperature but after about 200 ml was added, the mixture was cooled in an ice water bath to prevent reflux. An additional 100 g was then added dropwise over a period of 0.5 hours and the ice bath removed. The mixture was then stirred for 8 hours and an extra 83.0 g of bis(trimethylsilyl) acetamide (0.41 mol) was added and the mixture refluxed for 4 hours. The mixture was then allowed to stand overnight and filtered. The ether was then removed under aspirator vacuum and then the product filtered again. Anhydrous ethanol (40 ml) was then added to remove the residual trimethylsilylacetamide and the mixture stirred overnight. The mixture was then distilled at 2 mm Hg (bp 38°-40° C.) to give a product contaminated with about 2% acetamide which had apparently azeotroped with the product. It was therefore diluted with an equal volume of LBPE and then filtered through a pad of activated alumina (80–200 mesh). The material was then redistilled through a 1 meter packed column at 2.2 mm Hg (bp 40°-43° C.) to give 322.3 g of material (63% yield) which was greater than 99.8% pure by $^1$H-NMR. $^1$H-NMR (CDCl$_3$), δ:0.11 (s, Si—CH$_3$), 1.25 (s, CH$_3$), 3.59 (s, OCH$_2$), 4.31, 4.46 (AB quartet, OCH$_2$, ring protons).

Catalysts. The i-Bu$_3$Al-0.7 H$_2$O in n-heptane cationic catalyst and the "chelate" catalyst (Et$_3$Al-0.5 H$_2$O-0.5 acetylacetone) were prepared as described by Vandenberg (See: *J. Polym. Sci. Polym. Chem. Ed.* 7, 525 (1969)).

The polymers are prepared by polymerization with coordination catalysts such as R$_3$Al-x H$_2$O-y (chelating agent), wherein x=0.1 to 1.5 and y=0.01 to 2.0, and certain preferred cationic catalysts such as R$_3$Al-x H$_2$O, wherein x=0.1 to 1.5. Exemplary of the chelating agents are acetylacetone, trifluoroacetylacetone, ethoxyacetic acid, etc.

Exemplary of organoaluminum compounds which may be so reacted with water, or with a chelating agent and with water and used as the catalyst are triethylaluminum, tripropylaluminum, triisobutylaluminum, trioctylaluminum, diethylaluminum hydride, diisobutylaluminum hydride, and the like. A typical catalyst of the first type for the purposes of this invention is the product obtained by reacting 1 mole of triisobutylaluminum with 0.5 mole of water. A typical catalyst of the second type is the product obtained by reacting 1 mole of triethylaluminum with 1 mole of acetylacetone and with 0.5 mole of water. Catalyst measurements in millimols (mmol) are calculated on the basis of the organometallic or metallic moeties in the catalyst.

Polymerization. Polymerizations were run under nitrogen in capped tubes with self sealing rubber lined caps (Buna N or butyl rubber) by the general procedure previously described by Vandenberg (See: *Macromolecular Synthesis*, W. J. Bailey, Ed., Wiley, N.Y., 1972, Vol. 4, p. 52, Note 6) except that nitrogen sparging of the closed but vented vessel for at least 20 minutes was used to remove air before introducing reagents or solvent. Reagents were added via syringe or cannulae. All solvents used for polymerizations were deoxygenated before use by bubbling a stream of nitrogen through them for at least 20 minutes. The containers were either tumbled in a constant temperature bath, stirred with a Teflon ®-coated magnetic stirring bar or placed in a bath (e.g., at −78° C.) with periodic shaking if needed. Runs were usually shortstopped with anhydrous ethanol (5 ml/10 ml monomer). Data on polymerizations are reported for a 10 ml monomer basis, although the runs were usually made with 2.0 ml of monomer in small tubes. Other polymerization details such as reaction times, unusual catalyst preparation conditions, are shown in Examples I-XXI, infra.

In one practice of the present invention, high molecular weight PBHMO and PMHMO, and copolymers of BHMO with MHMO were prepared as follows.

High molecular weight PBHMO, PMHMO (Table I) and BHMO/MHMO copolymers (Table II) were made by polymerization of the respective trimethylsilyl ethers, BTMSO and MTMSO, using the i-Bu$_3$Al-0.7 H$_2$O cationic catalyst. High molecular weight PBHMO could also be made by using this catalyst on the cyclic ketal DTN (8, Table I). The coordination "chelate" catalyst (as described above under catalyst preparation) generally gave lower molecular weight products than the i-Bu$_3$Al-0.7 H$_2$O cationic catalyst. The copolymerization of BTMSO with MTMSO is a perfect one with the polymer having essentially the same composition at low conversion as the monomer change.

Some of these compositions, especially those containing >40% MHMO, have high melting points, and are readily melt fabricable whereas PBHMO is not. Copolymers of BHMO with EHMO are also useful since less EHMO is needed to reduce the melting point and yield melt fabricable compositions. Copolymers of BHMO with <20%, preferably <10% of other oxetanes, oxiranes, and tetrahydrofurans are also useful compositions and provide alternate ways of reducing the melting point, inducing melt fabricability and also other desirable properties.

PBHMO, PMHMO, and the copolymers of BHMO with MHMO were isolated, based on 10 ml of monomer, by adding 200 ml of toluene to the polymerization product along with 300 ml of 3% HCl to a nitrogen filled vessel which was then tumbled for 24 hours at 65° C. The resulting gel was filtered, washed with one 300 ml portion of distilled water and one 300 ml portion of acetone. Only insignificant amounts of material were recovered after stirring these combined liquid phases under aspirator vacuum to remove the toluene layer, then dialyzing neutral and freeze drying. The gel was then washed with one more 300 ml portion of acetone and then washed neutral with distilled water and dried overnight under vacuum (0.2 mm Hg). Such a procedure was found to leave about 1% H$_2$O in PBHMO and about 0.5% H$_2$O in the case of PMHMO.

In the case of PMHMO, it was occasionally found that such a procedure yielded polymer which was not entirely soluble in N,N-dimethylacetamide (DMAA) or DMSO, although the amount of insoluble appeared to be fairly small. Since $^1$H-NMR in 2:1 CF$_3$COOD:(CF$_3$CO)$_2$ showed no residual Me$_3$Si resonances it was assumed that the insolubility was due to crosslinking by residual metal-alkoxy linkages due to catalyst residues. In order to remove these linkages, 10 g of polymer was first swelled by stirring with acetone (400 ml) for 1.5 hours, filtering and washing with two-400 ml portions of distilled H$_2$O, then tumbling for 24 hours at 65° C. with 300 ml 3% HCl. The insoluble was collected, washed neutral with distilled water, and dried as usual to give 98–99% recovered polymer which was completely soluble in DMSO.

NMR data, reported herein, was obtained at 100.6 MHz on a Brucker AM-400 FT-NMR spectrometer. Chemical shift data were relative to the isotope impurity peaks in deuterated chloroform (CDCl$_3$) (7.25 $\delta$) and deuterated dimethylsulfoxide (DMSO-d$_6$)(2.49 $\delta$) unless otherwise noted. In trifluoroacetic acid-d and deuterated water (D$_2$O), zero was assigned to the methyl peak of 3-(trimethylsilyl)propanoic 2,2,3,3-d acid$_4$ ("TSP-d$_4$"). In D$_2$SO$_4$, zero was assigned to the methyl peak of 3-(trimethylsilyl)-1-propanesulfonic acid sodium salt (DSS). As used herein, the notation "d" means that deuterium atoms were present in the compound instead of hydrogen and the subscript identifies how many deuterium atoms.

$^1$H-NMR of PMHMO (11, Table I) in 73% D$_2$SO$_4$ (DSS), $\delta$:4.08 (broad, C$\underline{H}_2$OSO$_3$H); 4.02, 3.99 (shoulders, C$\underline{H}_2$OH); 3.44 (broad, chain C$_2$); 1.006 (shoulder, C$\underline{H}_3$), 0.989 (C$\underline{H}_3$). The assignments for the esterified hydroxymethyls were deduced from the observation that the peak at $\delta$ 4.08 decreased with time upon the addition of D$_2$O to 73% D$_2$SO$_4$ solutions of PMHMO.

$^1$H-NMR of PBHMO in 73% D$_2$SO$_4$ (DSS), $\delta$:4.20 (broad, C$\underline{H}_2$OSO$_3$H), 3.96 (broad, C$\underline{H}_2$OH), 3.48 (broad, chain C$\underline{H}_2$). The assignments for the esterified hydroxymethyl were also proven by addition of D$_2$O to 73% D$_2$SO$_4$ solutions of PBHMO.

Several derivatives of PBHMO were prepared such as the formate by reacting PBHMO with formic acid and the acetate by reacting PBHMO with acetic anhydride.

Among the monomers which can be successfully employed in the practice of the present invention are tetrahydrofuran ("THF") and substituted tetrahydrofurans in which the substituent is selected from the group consisting of alkyl having from one to seven carbon atoms; aryl having from six to fifteen carbon atoms; hydroxyalkyl having from one to seven carbon atoms; haloalkyl having from one to seven carbon atoms; and halogen. Examples of such substituted THFs include: 2-methyl-THF; 3-methyl-THF; 2,2-dimethyl-THF; 3,3-dimethyl-THF; 2-phenyl-THF; 3-phenyl-THF;2-chloro-THF; 3-chloro-THF; 2-chloromethyl-THF; 3-chloromethyl-THF; 3,3-bis(chloromethy)THF; the trimethylsilyl ether of 2-hydroxymethyl THF, and the like. Of the foregoing, polymers made with THF as the comonomer are preferred.

Other monomers which can be successfully employed in the practice of this invention include those having an epoxy group, that is, an oxirane or oxetane ring which are herein referred to as "oxiranes" and "oxetanes", respectively. Exemplary of the oxiranes useful herewith are the alkylene oxides such as ethylene oxide, 1,2-propylene oxide, butene oxides (butene-1-oxide and the cis- and trans-butene-2-oxides), isobutylene oxide; substituted alkylene oxides such as epichlorohydrin, epibromohydrin, epifluorohydrin, methallyl chloride epoxide, trifluoromethylethylene oxide, perfluoropropylene oxide, perfluoroethylene oxide, vinyl chloride epoxide, dichloroisobutylene epoxide, and the like; cycloaliphatic epoxides such as cyclohexene oxide, vinyl cyclohexene monoxide, vinyl cyclohexene dioxide, α-pinene epoxide, dipentene epoxide, and the like; epoxy ethers such as alkyl glycidyl ethers, such, for example, as methyl glycidyl ether, ethyl glycidyl ether, isopropyl glycidyl ether, isobutyl glycidyl ether, tert-butyl glycidyl ether, n-hexyl glycidyl ether, n-octyl glycidyl ether, and the like; phenyl glycidyl ether, chlorophenyl glycidyl ethers, nitrophenyl glycidyl ethers, alkylphenyl glycidyl ethers chloroalkyl glycidyl ethers, such as chloroethyl glycidyl ether; unsaturated glycidyl ethers such as vinyl glycidyl ether, allyl glycidyl ether, σ-allyphenyl glycidyl ether, and the like; glycidyl esters such as glycidyl acetate, glycidyl propionate, glycidyl pivalate, glycidyl methacrylate, glycidyl acrylate, glycidyl oleate, glycidyl resinate, and the like; alkyl glycidates such as methyl glycidate, ethyl glycidate, and the like; and other epoxides, such, for example, as styrene oxide, α-methylstyrene oxide, butadiene monoxide, butadiene dioxide, epoxy stearates, 1-dimethylamino -2,3-epoxy propane, trimethyl-2,3-epoxypropyl ammonium chloride, and the like. Particularly useful are ethylene oxide and its mono-substituted derivatives such as propylene oxide, epihalo-hydrins, and the like. Also, especially useful are oxiranes containing hydroxyalkyl groups in which the active hydrogen is replaced with a non-reactive, easily removable group, such as trialkylsilyl. Especially preferred are the trimethylsilyl ethers of glycidol, 1,1-bis(hydroxymethyl)ethylene oxide, and cis- and trans-1,4-dihydroxy-2,3 epoxybutane.

Other oxetanes which can be copolymerized herein are characterized by the structural formula:

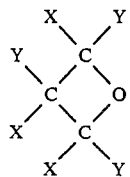

wherein each X and each Y substituent is any group which does not react with the catalyst, such, for example, as free hydroxyl, primary amino, or secondary amino groups except where such reactive hydrogens are replaced with a non-reactive, easily replaceable group such as trialkylsilyl. By way of further example, suitable X and Y substituents include: hydrogen; halogens including fluoro, chloro, bromo, and iodo substituent groups; alkyl, cycloalkyl, aryl, and aralkyl groups such as methyl, ethyl, propyl, butyl, cyclohexyl, phenyl, tolyl, benzyl, and the like; nitroalkyl such as nitromethyl, nitro-ethyl, and the like; nitratoalkyl such as nitratomethyl, nitratoethyl, and the like; cyanoalkyl such as cyanomethyl, cyanoethyl, and the like; alkoxy, aryloxy, aralkoxy, such as methoxy, ethoxy, phenoxy, and the like; alkyl-, cycloalkyl-, aryl-, and aralkyloxymethyl groups such as methoxymethyl, ethoxymethyl, phenoxymethyl, benzyloxymethyl, and the like; acyloxyalkyl groups such as acetoxymethyl, acetoxyethyl, benzoxymethyl, and the like; haloalkyl groups such as chloromethyl, bromoethyl, iodomethyl, fluoromethyl, chloroethyl, chloropropyl, and the like; tertiary aminoalkyl groups such as dimethylaminomethyl, dimethylaminoethyl, and the like; acylamidoalkyl groups such as acetamidomethyl, sulfonamidomethyl, and the like; ethylenically unsaturated aliphatic radicals such as vinyl, propenyl, isopropenyl, allyl, methallyl, butenyl, allyloxymethyl, propenyloxymethyl, methallyloxymethyl, oleyl, and the like; and cycloalkyl or aryl radicals containing an ethylenically unsaturated substituent and cycloalkyl radicals containing an ethylenic double bond in the ring, as, for example, 4-vinylcyclohexyl, α-terpinyl, terpinyl, abietyl, cyclohexenylmethyl, o-allylphenyl, p-vinylbenzyl, and the like. Illustrative of typical oxetanes which the comonomer can comprise include oxetane, 2-bromo oxetane, 2-methyl oxetane, 2-cyclohexyl oxetane, 2-benzyl oxetane, 2-nitropropyl oxetane, 2-cyanoethyl oxetane, 2-methoxy oxetane, 2-phenoxy oxetane, 2-methoxyethyl oxetane, 2-benzyloxymethyl oxetane, 2-allyl oxetane, 2-vinylbenzyl oxetane, 2-chloromethyl oxetane, and the like; 2,2-bis (chloromethyl) oxetane, 2,2-bis(2-chloroethyl) oxetane, 2,2-dimethyl oxetane, 2-chloro-2-methyl oxetane, 2-fluoro-2-bromomethyl oxetane, 2,2-bis(nitratomethyl) oxetane, 2-methoxy-2-methyl oxetane, 2-carbomethoxy-2-chloromethyl oxetane, 2-methallyl-2-methyl oxetane, and the like; 2-vinyl-3,3-bis(chloromethyl) oxetane, 2-methoxy-3,3-bis(bromomethyl) oxetane, 2-vinylbenzyl-3,3dimethyl oxetane, 2-allyloxymethyl-3-chloromethyl3-ethyl oxetane, 2-phenoxymethyl-3-fluoro-3-methyl oxetane, and the like; 2-methyl-3,3-bis(chloromethyl)-4-methyl oxetane, 2-vinyl-3,3-bis(iodomethyl)-4-methoxy oxetane, 2-chloromethyl-3,3-dimethyl-4- chloromethyl oxetane, 2-chloro-3-ethyl-3-methoxymethyl-4-(o-allylphenyl) oxetane, 2-ethyl-3,3-bis(phenoxymethyl)-4-allyl oxetane, and the like; 2-methyl-3-methyl oxetane, 2-chloromethyl-3-bromo oxetane, 2-methoxy-3-butenyl oxetane, 2-methallyloxymethyl-3-ethyl oxetane, 2-propenyl-3-bromoethyl oxetane, 2-methoxymethyl-3-propyl oxetane, and the like; 3-chloro oxetane, 3-ethyl oxetane, 3-cyclohexyl oxetane, 3-phenyl oxetane, 3-methoxy oxetane, 3-allyl oxetane, 3-chloromethyl oxetane, 3-vinyl oxetane, and the like; 3,3-bis(chloromethyl) oxetane, 3,3-bis(bromomethyl) oxetane, 3,3-bis(iodomethyl) oxetane, 3,3-bis(fluoromethyl) oxetane, 3,3-bis(2-chloroethyl) oxetane, 3-bromomethyl-3-choromethyl oxetane, 3,3-dimethyl oxetane, 3,3-diethyl oxetane, 3,3-bis(chloro) oxetane, 3,3-bis(bromo) oxetane, 3-chloro-3-chloromethyl oxetane, 3-bromo-3-ethyl oxetane, 3-fluoro-3-bromomethyl oxetane, 3-fluoro-3-chloro oxetane, 3-ethyl-3-methyl oxetane, 3-chloromethyl-3-ethyl oxetane, 3-chloromethyl-3-methyl oxetane, 3,3-bis (cyanomethyl) oxetane, 3,3-bis(nitratomethyl) oxetane, 3-chloromethyl-3-nitromethyl oxetane, 3-methoxy-3-methyl oxetane, 3-ethyl-3-methoxymethyl oxetane, 3-ethoxymethyl-3-methyl oxetane, 3-carbomethoxy-3-chloromethyl oxetane, 3,3-bis (phenoxymethyl) oxetane, 3-vinyl-3-methyl oxetane, 3-allyl-3-chloromethyl oxetane, 3-isopropenyl-3-ethyl oxetane, 3-chloromethyl-3-(4-vinylcyclohexyl) oxetane, 3-methyl-3-methally oxetane, 3,3-bis(allyl) oxetane, and the like; 2-methyl-3-methyl-4-methyl oxetane, 2-ethyl-3-chloromethyl -4-ethyl oxetane, 2-chloromethyl-3-vinyl-4-chloromethyl oxetane, 2-methoxy-3-bromo-4-methyl oxetane, 2-allyl-3-methoxy-4-carbomethoxy oxetane, and the like; 2-methyl-4-methyl oxetane, 2-vinyl-4-chloroethyl oxetane, 2-chloro-4-allyl oxetane, 2-methoxy-4-ethyl oxetane, 2-chloromethyl-4-chloromethyl oxetane, 2-chloromethyl-4-cyanomethyl oxetane, and the like. Moreover, mixtures of two or more of any of the above oxiranes or oxetanes can be used as the comonomer component whenever it is desired, as, for example, to modify the properties of the end product.

Films and fibers of PBHMO were easily made by melt pressing, solution casting or solution spinning PBHMO acetate and thereafter saponifying the acetate to give PBHMO films and fibers.

A 1:1 BHMO:MHMO copolymer (3, Table II) was melt pressed under 22 tons force for 7 minutes at 265° C. The resulting film was somewhat brittle and opaque although it became tough after soaking in water overnight.

A 1:2 BHMO:MHMO copolymer (1, Table II) was melt pressed at 225° C. for 5 minutes under 22 tons force to give a film which failed to fuse completely. The film was then cut up into pieces and repressed at 250° C. for 6 minutes under 22 tons force. The resulting film was somewhat opaque and tough Films of PMHMO were made by melt pressing PMHMO (8, Table I) at 195° C. under 22 tons of pressure for about 5 minutes. The resulting film was found to be clear and tough. When saturated with H₂O by soaking at least three weeks in distilled water, these films were found to contain 2.6% H₂O based on weight loss after drying overnight under vacuum (<0.1 mm Hg). Narrow strips of such films could be cold drawn to enhance mechanical properties after plasticization by soaking in water overnight.

Viscosities were run at concentrations of 0.1 grams of the polymer in 100 ml of solution using 75% (w/w) H₂SO₄ at 30° C. and were corrected for the slow degradation in this solvent by running several times after solution preparation and extrapolating back to zero time. Viscosities were converted to inherent viscosities using $$n_{inh} = \frac{\ln n_r}{C}.$$

where $n_r$ is relative viscosity and C is 0.1.

X-ray crystallinity data was obtained on a Rigaku D/Max II-B diffraction system with a Cu target and with the sample supported on a quartz slide.

Differential scanning calorimeter (DSC) analyses were used to characterize the melting behavior of the polymers. A duPont thermoanalyzer connected to a 910 DSC vented cell was heated at a 20° C./minute heating rate using the procedure given by ASTM Method D3418-75 using Sn for calibration. Values shown herein as melting point (mp) represent the temperature at which the crystallinity of the polymer completely disappeared.

NMR data, namely, ¹H-NMR at 400 MHz and ¹³C-NMR at 100.6 MHz, was obtained on a Bruker AM-409 FT-NMR spectrometer.

Tacticity of PMHMO was determined from the resolution enhanced ¹H-NMR in 2:1:1 CF₃COOD:(CF₃CO)₂O:CDCl₃ of the chain methylene, and methyl protons in the resultant trifluoroacetate. The results indicate an atactic polymer.

Density data were determined with an air comparison pycnometer (Beckman Model 930) using helium.

An important characteristic of the polymers hereof is water absorption.

$T_g$ and related data were determined at about 1 Hz using torsional braid analysis ("TBA") as described by Gillham (See: *Developments in Polymer Characterization*, Vol. 3, J. V. Dawkins, Ed., Applied Science Publishers, Ltd., London, 1982, Chap. 5, page 159).

The solubility of PBHMO was examined and it was determined that PBHMO is soluble in 75% or greater concentration of H₂SO₄, dissolving after 2-8 hours of stirring in 75% H₂SO₄. It was marginally soluble in lower H₂SO₄ concentrations, taking several days of stirring in 65% H₂SO₄ to give a turbid solution. An ¹H-NMR of a 73% D₂SO₄ solution of PBHMO taken soon after dissolution (2.5 hours after mixing) revealed 3 peaks at δ:3.48, 3.97 and 4.20 (DSS) of ratio 1.00:0.35:0.65. This ratio did not change with time. Addition of D₂O to this solution, however, causes a gradual decrease in the intensity of the broad peak at δ:4.20 over a period of a few days, indicating that this peak is due to —CH₂OSO₃H groups (corresponding to 65% substitution) which hydrolyze on decreasing the D₂SO₄ concentration. The remaining two peaks at δ:3.48 and 3.97 must be due to chain methylene and unesterfied $C\overline{H}_2OH$ protons respectively.

High molecular weight PBHMO dissolved rapidly in CF₃COOD with agitation but generally precipitated within 1-4 hours at room temperture while the lowest molecular weight linear PBHMO (10, Table I) stayed in solution for 13-20 hours. These solutions show three resonances at δ:4.57, 3.94 and 3.53 (TSP-d₄). Unlike cellulose, PBHMO was found to be insoluble in 85% H₃PO₄.

High molecular weight PBHMO unlike cellulose, was found to be insoluble in dimethylacetamide containing 7.8% LiCl both at room temperature and at 110° C. in a nitrogen filled vessel. It was also found to be insoluble in DMSO at room temperature and at 65° C. Unlike cellulose it was also found to be insoluble in quaternary ammonium bases such as 40% benzyltrimethylammonium hydroxide in methanol (Triton B) and tetraethylammonium hydroxide (20% aqueous solution) at room temperature and at 65° C.

As with cellulose, PBHMO was found to be soluble in 4-methylmorpholine-N-oxide (MMNO) as MMNO·0.7 H₂O at 100° C. PBHMO was not soluble in MNMO without added water or at water levels at or above the monohydrate.

In summary, high molecular weight PBHMO with $n_{inh}$ up to 3.7 dL/g was preferably made by polymerizing the bis-(trimethylsilyl)ether or cyclic acetone ketal of BHMO in toluene diluent with the i-Bu₃Al-0.7 H₂O cationic catalyst at temperatures from 0° C. up to 50° C. (Table I, 1, 3 and 4), followed by HCl hydrolysis to remove the protecting group. The Et₃Al-0.5 H₂O-05 acetyl acetone coordination catalyst polymerized these monomers in bulk at 65° C. but to a somewhat lower $n_{inh}$ (up to 0.8 Table I, 2 and 6). PBHMO is a crystalline, very high melting (314° C.), and highly insoluble polymer much like its analog, cellulose. However, many of the solvents which dissolve cellulose do not dissolve PBHMO e.g., 85% H₃PO₄, quaternary organic bases such as 40% (in CH₃OH) benzyltrimethyl ammonium hydroxide and 20% (in H₂O) tetraethylammonium hydroxide.

The only cellulose solvent in which PBHMO dissolves without reaction is N-methylmorpholine N-oxide-0.7 H₂O at 100° C. PBHMO does dissolve at room temperature in 75% H₂SO₄ and trifluoroacetic acid, TFA, solvents which also dissolve cellulose, presumably only after reaction to form esters with both polymers. The 75% H is the best solvent for viscosity measurements at 30° C. During this test, ester formation reaches an equilibrium level of 65% substitution as soon as the polymer is completely dissolved (about 4 hours at 25° C.) Thus, the low level of viscosity loss that occurs during the viscosity test, especially for the highest molecular weight PBHMO is due to a degradation reaction in 75% H₂SO₄. A small correction can be easily made for this degradation, based on the time required for dissolution, to give viscosity data within experimental error. Based on the literature data for cellulose in 75% H₂SO₄ where temperatures below 0° C. are required to obtain low rates of degradation, PBHMO is at least an order of magnitude more acid stable than cellulose.

The density of PBHMO, 1.28, is surprisingly low compared to cellulose which has a density of 1.5-1.6 depending on crystallinity level. This result would imply that there will be large differences in mechanical, physical and chemical properties, in related properties such as permeability, etc., and thus in the utility of PBHMO compared to cellulose.

Films and fibers were prepared from PBHMO. Oriented film was successfully made by preparing a film of the acetate of PBHMO, either by casting from CHCl₃ solution or by compression molding at 200°-230° C., swelling for 15 minutes in ethyl acetate and then drawing by hand at room temperature by about 300%. This film was then hydrolyzed by refluxing for 16 hours in 1 M NaOH under nitrogen. Infrared examination confirmed that hydrolysis was complete. X-ray examination confirmed that the film was well oriented. The oriented PBHMO was no longer brittle and could be creased without breaking.

Oriented fiber was made by drawing a fiber out of a viscous (20-30%) solution of PBHMO acetate in chloroform at room temperature and then further drawing at room temperature. Hydrolysis as above for PBHMO film gave PBHMO fiber having a diameter of 3 mils, a tensile strength of 24,000 psi, and an ultimate elongation of 30% at room temperature.

The BHMO-MHMO copolymers are unusual since there is a simple linear dependence of melting point on composition which indicates a mixed crystal formation. This conclusion is further confirmed by the fact that all of the copolymers are crystalline based on DSC data. The occurrence of co-crystallizable, different chain units is not common for polymers and is generally referred to as isodimorphism or isomorphism. The present polymers appear to be isomorphic since there appears to one crystalline phase containing both monomer units at all compositions and there is no melting point minimum as would exist if the polymers were isodimorphic.

X-ray diffraction studies indicate that the major spacing differs only slightly, if at all, from PBHMO (5.23 Å) to PMHMO (5.09 Å). Copolymers high in BHMO or high in MHMO have their major spacing near that of the corresponding homopolymer. Heat of fusion—($\Delta H_f$ data) vs. composition for the BHMO-MHMO copolymers shows that copolymers with more than 50% BHMO have higher heats of fusion believed to result from the greater content of hydrogen bonds.

Anticipated uses of the polymers herein described include use as hydrophilic fibers (as is or cross-linked), films, oxygen barrier resins, coatings, contact lenses, intraocular lenses, prosthetic devices, membranes for purification processes such as water desalination, separation of gases, dialysis and the like. The nitrate ester derivative are also useful as components of explosives, propellants, and as coatings.

The crystalline, hydroxyl-containing polyethers produced by the present invention are high melting polymers which have excellent physical properties and are readily converted into fibers of superior properties by melt or solution spinning techniques.

The copolymers of this invention which are water soluble are particularly useful as thickeners, dispersing agents, protective colloids, oil well drilling additives, starch modifiers, adhesives, binders, textile sizes, detergent additives, coagulants, and the like.

The products of this invention can also contain stabilizers such as ultraviolet light absorbers, antioxidants, particularly of the phenolic or aromatic amine type, antacids, and the like, as well as other additives such as plasticizers, fillers, as, for example, silica, asbestos, clay, carbon black, reactive silanes, and the like.

PBHMO may be alloyed with PMHMO and PEHMO or both, and each may be alloyed with BHMO-MHMO copolymers, MHMO-EHMO copolymers, BHMO-EHMO copolymers, other alloys of PMHMO, PBHMO and PEHMO, and various combinations thereof to produce unique and useful compositions. Such alloys are possible because of the close similarity of their crystal structures and can be prepared in a number of ways. For instance, such alloys can be formed either by blending the final polymerization products of the trimethylsilyl (or comparable blocking group) ether of each polymer or copolymer at a temperature at which each polymer/copolymer is in solution, or at least well dispersed, and thereafter hydrolyzing the mixture and thereafter isolating the alloy from the other components of the hydrolyzed mixture; or by first hydrolyzing the ethers of each polymer or copolymer, isolating dry hydroxyl-containing polymers/copolymers and thereafter blending the isolated hydroxyl-containing polymers/copolymers at a temperature at or near the melting point of the mixture so that each polymer/copolymer is in solution or at least well dispersed.

Other useful alloys of the polymers and copolymers of the present invention can also be created with other polymers, particularly with those polymers containing hydroxyl groups such as poly(vinyl alcohol), ethylene-vinyl alcohol copolymers, cellulose and its derivatives, starch and its derivatives, and the like, or with polymers having other hydrogen-bonding groups contained therein such as polyamide (e.g., poly(hexamethylene adipamide), poly(phenylene terephthalate) and the like) or polymers which form hydrogen-bonds with hydroxyl groups (such as poly(alkyl vinyl ether); poly(alkylene oxide); poly(epichlorohydrin); and polyesters (such as poly(ethylene terephthalate), poly(acrylonitrile) and the like. Melt (or near melt) or solution blending can be used.

The aforedescribed technique of blending the isolated components at or near the melting point of the mixture, but at least at the temperature of maximal dispersion, is well suited to the preparation of these alloys as well.

To further aid in the understanding of the present invention, and not by way of limitation, the following examples are presented.

EXAMPLES I-XIII

A plurality of homopolymerizations of DTN, BTMSO and MTMSO were conducted in accordance with the above described protocol to obtain PBHMO and PMHMO. The results are tabulated in Table I, shown below, and relevant information is provided in the notes thereto.

TABLE I

| Homopolymerizations of DIN, BTMSO and MTMSO to obtain PBHMO and PMHMO | | | | | | | | | | |
|---|---|---|---|---|---|---|---|---|---|---|
| | | | | | | | | Isolated Hydrolysed Polymer | | |
| | Diluent | | Catalyst | | Time | Temp. | Insoluble Conversion | DSC[a] | | $\eta_{inh}$[b] |
| No. | Name | mL | type | mmol | (h) | (°C.) | (%) | mp °C. | $\Delta H_F$ cal/g | (dL/g) |
| With 3,3-bis-(trimethylsilyloxymethyl)-oxetane | | | | | | | | | | |
| I | Toluene | 50 | i-Bu₃Al—0.7 H₂O | 1.0 | 21.5 | 0 | 100 | — | — | 5.18 |
| II | Toluene | 50 | i-Bu₃Al—0.7 H₂O | 2.0 | 21.5 | 0 | 100 | 314 | 34.3 | 4.16 |

TABLE I-continued
Homopolymerizations of DIN, BTMSO and MTMSO to obtain PBHMO and PMHMO

| | Diluent | | Catalyst | | Time | Temp. | Insoluble Conversion | DSC[a] | | $\eta_{inh}$[b] |
|---|---|---|---|---|---|---|---|---|---|---|
| No. | Name | mL | type | mmol | (h) | (°C.) | (%) | mp °C. | $\Delta H_F$ cal/g | (dL/g) |
| III | Toluene | 100 | i-Bu$_3$Al—0.7 H$_2$O | 1.0 | 5.7 | 50 | 100 | — | — | 2.98 |
| IV | Toluene | 50[c] | i-Bu$_3$Al—0.7 H$_2$O | 2.0 | 55.5 | 0 | 100 | — | — | 1.97 |
| V | Toluene | 50[c] | i-Bu$_3$Al—0.7 H$_2$O | 2.0 | 22.5 | 50 | 100 | — | — | 1.23 |
| VI | Toluene | 50[d] | i-Bu$_3$Al—0.7 H$_2$O | 2.0 | 19 | 0 | 96 | — | — | 3.35 |
| VII | — | — | Et$_3$Al—0.5 H$_2$O—0.5 AA | 1.6 | 15 | 65 | 79 | | | 0.76 |
| With 7,7-dimethyl-2.6.8-trioaspiro-[3.5]nonane | | | | | | | | | | |
| VIII | Toluene | 50 | i-Bu$_3$Al—0.7 H$_2$O | 3.9 | 47 | −78 → 5[e] | 62 | | | 2.19 |
| IX | — | — | BF$_3$.Et$_2$O | 0.18 | 24 | 25 | — | | | 0.56 |
| X | — | — | Et$_3$Al—0.5 H$_2$O—0.5 AA | 3.1 | 50.5 | 65 | 52 | | | 0.23 |
| With 3-(trimethylsilyloxymethyl)-3-methyl oxetane | | | | | | | | | | |
| XI | — | — | Et$_3$Al—0.5 H$_2$O—0.5 AA | 3.10 | 1.5 | 25 | 73 | 169 | 12.9 | 1.03[f] |
| XII | Toluene | 50 | i-Bu$_3$Al—0.7 H$_2$O | 1.0 | 21.5 | −78 → −27[g] | 75 | 165 | 12.5 | 3.78[f] |
| XIII | Toluene | 50[c] | i-Bu$_3$Al—0.7 H$_2$O | 1.0 | 25 | 0 | 99[h] | 9.87 | — | 2.39[f] |

NOTES TO TABLE I
[a]Reported values are for DSC 1st heat unless otherwise noted.
[b]In 75% H$_2$SO$_4$ at 30° C. and extrapolated to zero time as described in text unless otherwise indicated.
[c]Two mL Et$_2$O added before injecting catalyst.
[d]0.2 mL Et$_2$O added before injecting catalyst.
[e]Bath temperature maintained at −78°C. for 6 hours whereupon it was allowed to warm to +5° C. over a 41 hour period.
[f]In DMSO at 30° C.
[g]Began warming low temperature bath from −78° C. immediately upon injection of catalyst. Quenched polymerization by adding 10 mL of EtOH and 50 mL of toluene and allowing tube to warm to −20° C. overnight. The mixture was then tumbled 1 hour at 65° C. and then tumbled with 100 mL of 3% HCl overnight but the thick gel remained unchanged except for a white film on its surface. The mixture was then transferred to a larger bottle using 400 mL of toluene and 300 mL of 3% HCl. It was then tumbled for 48 hours more. The material was then filtered and the resulting swollen white clumps of gel ground up with a mortar and pestle. It was then placed in a capped bottle and tumbled 24 hours with 300 mL of 3% HCl. Work up of the hydrolyzed gel from MHMO in the manner described above gave PMHMO as a white powder.
[h]Product was incompletely soluble in DMSO as usually isolated. Further hydrolyzed as described in text to make it completely soluble.

EXAMPLES XIV–XVIII

Several copolymerizations of BTMSO with MTMSO were fun to create BHMO and MHMO copolymers. The results are reported in Table II shown below.

EXAMPLE XX

A homogeneous mixture of BTMSO (8.7 ml) and THF (0.27 ml)(6.66 mol % THF) was injected into a capped tube and reacted for 0.75 hours at 0° C. in accordance with Example II. The insoluble copolymer was worked up as described earlier and was 0.70 grams (20% conversion based on BTMSO monomer). $^1$H-NMR in CF$_3$COOD (TSP-d$_4$) at 400 MHz indicated 1.2 mol % THF (0.74 wt percent) based on a broad peak at 1.7 ppm due to the middle CH$_2$ of the THF unit. DSC: 1st heat, MP=311° C.; heated to 352° C., cooled to 25° C., reheated; 2nd heat, MP=309° C., $n_{inh}$=1.2.

TABLE II
Copolymerizations of BTMSO with MTMSO to obtain BHMO and MHMO copolymers

| | Mole Ratio BTMSO:MTMSO | Catalyst | | Time | Temp. | Conv. | % | Isolated Hydrolyzed Polymer | | |
| | | | | | | | | DSC[b] | | |
| No. | in Charge | Type | mmol | (h) | (°C.) | (%) | BHMO[a] | $\eta_{inh}$ (dL/g) | mp (°C.) | $\Delta H_F$ (cal/g) |
|---|---|---|---|---|---|---|---|---|---|---|
| XIV | 1:2 | i-Bu$_3$Al—0.7 H$_2$O | 0.5 | 2 | −39 | 8.3 | 67 | 4 | 208 | 14.5 |
| XV | 1:1 | Et$_3$Al—0.5 H$_2$O—0.5 AA | 1.58 | 1.5 | 25 | 26 | 46[c] | 0.94 | 241 | 26.3 |
| XVI | 1:1 | i-Bu$_3$Al—0.7 H$_2$O | 1.0 | 0.83 | 0 | 92 | 50 | 3 | 244 | 25.4 |
| XVII | 9:1 | Et$_3$Al—0.5 H$_2$O—0.5 AA | 1.58 | 4 | 25 | 33 | 9.7 | 0.73 | 300, 300[d] | 31.3[d] |
| XVIII | 9:1 | i-Bu$_3$Al—0.7 H$_2$O | 0.99 | 37 | −78 → −20 | 71 | 8.7 | 3.26 | 303 | 30.9 |

[a]Determined by $^1$H—NMR in 73% D$_2$SO$_4$ unless otherwise indicated.
[b]1st heat unless otherwise noted.
[c]Determined by $^1$H—NMR of crude reaction mixture before hydrolysis as described in text. Composition determined by $^1$H—NMR of the isolated polymer in DMSO—d$_6$ at 80° C. was the same within experimental error.
[d]2nd heat.

EXAMPLE XIX

A homogeneous mixture of BTMSO (8.7 ml) and THF (1.35 ml)(33.3 mol % THF) was injected into a capped tube and reacted for 0.75 hours at 0° C. in accordance with Example II. The insoluble copolymer was worked up as described earlier and was 0.165 grams (3.9% conversion based on BTMSO monomer). $^1$H-NMR in CF$_3$COOD (TSP-d$_4$) at 400 MHz indicated 5.7 mol % THF (3.5 wt percent) based on a broad peak at δ 1.7 ppm due to the middle CH$_2$ of the THF unit. DSC: 1st heat, MP=307° C.; heated to 312° C., cooled to 25° C., reheated; 2nd heat, MP=307° C., heated to 340° C., cooled to 60° C., reheated; 3rd heat, MP=307° C., heated to 365° C. (no evidence of decomposition). Recrystallization occurred on cooling at 235° C.–260° C. $\Delta H_f$=26 cal/g (1st heat); =32 cal/g (2nd heat). $n_{inh}$ >0.6.

EXAMPLE XXI

The trimethylsilyl ether of [3-(ethyl-3-hydroxymethyl)oxetane] was polymerized in 50 ml of toluene with 2.0 mmol of i-Bu$_3$Al-0.7H$_2$O at 0° C. for 21.5 hours. The resulting PEHMO, obtained in 100% conversion, had an inherent viscosity of 3.0 in DMSO at 25° C., was highly crystalline and had a mp of about 110° C.±10° C. based on DSC.

From the foregoing, it becomes apparent that new and useful procedures have been herein described and illustrated which fulfill all of the aforestated objectives in a remarkably unexpected fashion. It is of course understood that such modifications, alterations and adaptations as may readily occur to an artisan having the ordinary skills to which this invention pertains are intended within the spirit of the present invention which is limited only by the scope of the claims appended hereto.

Accordingly, what is claimed is:

1. Poly[3,3-bis(hydroxymethyl)oxetane] (PBHMO) having a weight average molecular weight of greater than 50,000 and a melting point of at least about 300° C.

2. Poly[3-methyl-3-(hydroxymethyl)oxetane] (PMHMO) having a weight average molecular weight of greater than 50,000 and a melting point of at least about 150° C.

3. Poly[3-ethyl-3-(hydroxymethyl)oxetane] (PEHMO) having a weight average molecular weight of greater than 50,000 and a melting point of at least about 100° C.

4. A method of producing poly [3,3-bis(hydroxymethyl)oxetane] and the 3-methyl and 3-ethyl analogs thereof comprising: polymerizing a trimethylsilyl ether of oxymethyloxetane with a catalyst consisting of a trialkylaluminum-$H_2O$ reaction product wherein the mol. ratio of the Al to $H_2O$ is 1:0.1 to 1.3.

5. A homopolymer of BHMO, MHMO and EHMO having a weight average molecular weight of at least 50,000.

6. A copolymer of 3,3-substituted oxetane monomers selected from the group consisting of BHMO, MHMO and EHMO.

7. A copolymer according to claim 6 having a weight average molecular weight of at least 50,000.

8. A copolymer according to claim 7 containing at least 50% (W/W) of said 3,3-substituted oxetane monomers and one or more monomers selected from the group consisting of oxetanes, oxiranes and tetrahydrofurans.

9. A copolymer according to claim 8 in which said substituted oxetane monomer is BHMO.

10. A copolymer according to claim 8 in which said substituted oxetane monomer is MHMO.

11. A copolymer according to claim 8 in which said substituted oxetane monomer is EHMO.

12. A copolymer according to claim 8 containing at least 80% (W/W) 3,3-bis(hydroxylmethyl)oxetane.

13. A copolymer according to claim 8 containing 3,3-bis(hydroxymethyl)oxetane, 3-methyl-3(hydroxymethyl)oxetane, and 3-ethyl-(hydroxymethyl)oxetane.

14. A copolymer according to claim 12 containing at least 90% (W/W) of 3,3-bis(hydroxymethyl)oxetane.

15. An alloy containing a poly[3,3-substituted(hydroxymethyl)oxetane] selected from the group consisting of PBHMO, PEHMO and PMHMO and one or more components selected from the group consisting of: poly[3-methyl-3(hydroxymethyl)oxetane] (PMHMO); poly[3-ethyl-3(hydroxymethyl)oxetane] (PEHMO); poly[3,3-bis(hydroxymethyl)oxetane] (PBHMO); an alloy of PMHMO and PEHMO; an alloy of PMHMO and PBHMO; an alloy of PEHMO and PBHMO; a copolymer of 3,3-bis(hydroxymethyl)oxetane (BHMO) and 3-methyl-(hydroxymethyl)oxetane (MHMO); a copolymer of MHMO and 3-ethyl-(hydroxymethyl)oxetane (EHMO); and a copolymer of BHMO and EHMO.

16. An alloy according to claim 15 further containing a polymer having an active hyudroxyl group therein; selected from the group consisted of cellulose; a cellulose derivative; starch; a starch derivative; organic polymers having active hydrogen bonding groups therein; organic polymers which form hydrogen-bonds with hydroxyl groups; and polyesters.

* * * * *